US011968517B2

(12) United States Patent
Oswald et al.

(10) Patent No.: US 11,968,517 B2
(45) **Date of Patent: *Apr. 23, 2024**

(54) SYSTEMS AND METHODS FOR PROVIDING AUGMENTED AUDIO

(71) Applicant: Bose Corporation, Framingham, MA (US)

(72) Inventors: Charles Oswald, Salem, NY (US); Michael S. Dublin, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,352

(22) Filed: May 30, 2023

(65) Prior Publication Data

US 2023/0300554 A1 Sep. 21, 2023

Related U.S. Application Data

(63) Continuation of application No. 17/085,600, filed on Oct. 30, 2020, now Pat. No. 11,696,084.

(51) Int. Cl.
*H04S 7/00* (2006.01)

(52) U.S. Cl.
CPC .............. *H04S 7/302* (2013.01); *H04S 7/307* (2013.01)

(58) Field of Classification Search
CPC ...... H04S 7/302; H04S 7/307; H04S 2400/07; H04R 2499/13
See application file for complete search history.

(56) References Cited

U.S. PATENT DOCUMENTS

| | | | |
|---|---|---|---|
| 6,446,002 | B1 | 9/2002 | Barton |
| 7,305,097 | B2 | 12/2007 | Rosen et al. |
| 7,630,500 | B1 | 12/2009 | Beckman et al. |
| 8,325,936 | B2 | 12/2012 | Eichfeld et al. |

(Continued)

FOREIGN PATENT DOCUMENTS

| | | |
|---|---|---|
| WO | 2018127901 A1 | 7/2018 |

OTHER PUBLICATIONS

The International Search Report and the Written Opinion of the International Searching Authority, International Application No. PCT/US2021/072012, pp. 1-14, dated Feb. 11, 2022.

(Continued)

*Primary Examiner* — Ping Lee
(74) *Attorney, Agent, or Firm* — Bond, Schoeneck & King, PLLC

(57) ABSTRACT

A system for providing augmented audio to users in a vehicle, comprising: a plurality of speakers disposed in a perimeter of a cabin of the vehicle; and a controller configured to receive a first audio signal and a second audio signal, to drive the plurality of speakers in accordance with a first array configuration such that a bass content of the first audio signal is produced in a first listening zone within the vehicle cabin, and to drive the plurality of speakers in accordance with a second array configuration such that a bass content of the second audio signal is produced in a first listening zone within the vehicle cabin, wherein in the first listening zone a magnitude of the first bass content is greater than a magnitude of the second bass content and in the second listening zone the magnitude of the second bass content is greater than the magnitude of the first bass content.

16 Claims, 9 Drawing Sheets

(56) References Cited

U.S. PATENT DOCUMENTS

| | | | |
|---|---|---|---|
| 9,066,191 | B2 | 6/2015 | Strauss et al. |
| 9,075,127 | B2 | 7/2015 | Hess et al. |
| 9,215,545 | B2 | 12/2015 | Dublin et al. |
| 9,352,701 | B2 | 5/2016 | Vautin et al. |
| 9,445,197 | B2 | 9/2016 | Oswald et al. |
| 9,674,630 | B2 | 6/2017 | Mateos Sole et al. |
| 9,706,327 | B2 | 7/2017 | Brannmark et al. |
| 9,743,187 | B2 | 8/2017 | Bender |
| 9,913,065 | B2 | 3/2018 | Vautin et al. |
| 9,955,261 | B2 | 4/2018 | Ojala et al. |
| 10,056,068 | B2 | 8/2018 | Oswald et al. |
| 10,123,145 | B2 | 11/2018 | Vautin et al. |
| 10,694,313 | B2 | 6/2020 | Zilberman et al. |
| 10,812,926 | B2 | 10/2020 | Asada et al. |
| 2008/0101589 | A1 | 5/2008 | Horowitz et al. |
| 2008/0273708 | A1 | 11/2008 | Sandgren et al. |
| 2008/0273722 | A1 | 11/2008 | Aylward et al. |
| 2008/0273724 | A1 | 11/2008 | Hartung et al. |
| 2008/0304677 | A1 | 12/2008 | Abolfathi et al. |
| 2009/0214045 | A1 | 8/2009 | Fukui et al. |
| 2010/0226499 | A1 | 9/2010 | De Bruijn et al. |
| 2012/0008806 | A1 | 1/2012 | Hess |
| 2012/0070005 | A1 | 3/2012 | Inou et al. |
| 2012/0093320 | A1 | 4/2012 | Flaks et al. |
| 2012/0140945 | A1 | 6/2012 | Harris |
| 2013/0121515 | A1 | 5/2013 | Hooley et al. |
| 2013/0194164 | A1 | 8/2013 | Sugden et al. |
| 2014/0198918 | A1 | 7/2014 | Li et al. |
| 2014/0314256 | A1 | 10/2014 | Fincham et al. |
| 2014/0334637 | A1 | 11/2014 | Oswald et al. |
| 2015/0119130 | A1 | 4/2015 | Lovitt |
| 2015/0208166 | A1 | 7/2015 | Raghuvanshi et al. |
| 2016/0100250 | A1 | 4/2016 | Baskin et al. |
| 2016/0286316 | A1 | 9/2016 | Bleacher et al. |
| 2016/0360334 | A1 | 12/2016 | Wu et al. |
| 2016/0363992 | A1 | 12/2016 | Welti |
| 2017/0078820 | A1 | 3/2017 | Brandenburg et al. |
| 2017/0085990 | A1 | 3/2017 | Sladeczek et al. |
| 2018/0020312 | A1 | 1/2018 | Visser et al. |
| 2018/0077514 | A1 | 3/2018 | Lee et al. |
| 2018/0124513 | A1 | 5/2018 | Kim et al. |
| 2018/0146290 | A1 | 5/2018 | Christoph et al. |
| 2019/0104363 | A1 | 4/2019 | Vautin et al. |
| 2019/0357000 | A1 | 11/2019 | Karkkainen et al. |
| 2020/0107147 | A1 | 4/2020 | Munoz et al. |
| 2020/0275207 | A1 | 8/2020 | Zilberman et al. |

OTHER PUBLICATIONS

The International Search Report and the Written Opinion of the International Searching Authority, International Patent Application No. PCT/US2021/072072, pp. 1-13, dated Mar. 10, 2022.

SYSTEMS AND METHODS FOR PROVIDING AUGMENTED AUDIO

CROSS-REFERENCE TO RELATED APPLICATIONS

This is a continuation application of U.S. patent application Ser. No. 17/085,600 filed Oct. 30, 2020 and entitled "Systems and Methods for Providing Augmented Audio", the entire disclosure of which is incorporated herein by reference.

BACKGROUND

This disclosure generally relates to systems and method for providing augmented audio in a vehicle cabin, and, particularly, to a method of augmenting the bass response of at least one binaural device disposed in a vehicle cabin.

SUMMARY

All examples and features mentioned below can be combined in any technically possible way.

According to an aspect, a system for providing augmented audio in a vehicle includes: a plurality of speakers disposed in a perimeter of a cabin of the vehicle; and a controller configured to receive a first content signal and a second content signal, and to drive the plurality of speakers in accordance with a first array configuration such that a bass content of the first content signal is produced in a first listening zone within the cabin, and to drive the plurality of speakers in accordance with a second array configuration such that a bass content of the second content signal is produced in a second listening zone within the cabin, wherein in the first listening zone a magnitude of the first bass content is greater than a magnitude of the second bass content and in the second listening zone the magnitude of the second bass content is greater than the magnitude of the first bass content.

In an example, the controller is configured to time-align, in the first listening zone, the production of the first bass content with a production of an upper range content of the first content signal by a first binaural device and to time-align, in the second listening zone, the production of the second bass content with a production of an upper range content of the second content signal by a second binaural device.

In an example, the controller is further configured to output to a first binaural device a first upper range of the first content signal and to a second binaural device a second upper range of the second content signal.

In an example, the controller is configured to receive at least one of the first bass content and the second bass content from a first mobile device.

In an example, the first listening zone, the magnitude of the first bass content exceeds the magnitude of the second bass content by three decibels, wherein, in the second listening zone, the magnitude of the second bass content exceeds the magnitude of the first bass content by three decibels.

In an example, the first listening zone is disposed about a first seating position in the vehicle and the second listening zone is disposed about a second seating position in the vehicle.

In an example, the controller forms the first array configuration and the second array configuration by implementing a plurality of filters, wherein the controller is configured to adjust at least one of the plurality of filters in accordance with an error signal.

In an example, the controller forms the first array configuration and the second array configuration by implementing a plurality of filters, wherein the plurality of filters are selected from a stored set of filters according to a parameter representative of a configuration of the vehicle cabin In example, the system further includes a first binaural device and a second binaural device, wherein the controller is configured to provide an upper range content of the first audio signal to the first binaural device, such that the first binaural device produces the upper range content of the first audio signal in the first listening zone, and to provide an upper range content of the second audio signal to the second binaural device, such that the second binaural device produces the upper range content of the second audio signal in the second listening zone.

In an example, the controller is configured to time-align, in the first listening zone, the production of the first bass content with a production of the upper range content of the first content signal by the first binaural device and to time-align, in the second listening zone, the production of the second bass content with a production of an upper range content of the second content signal by the second binaural device.

In an example, the time-alignment in at least one of the first listening zone or second listening zone is automatically determined according to at least one microphone signal.

In an example, the first binaural device and the second binaural device are each selected from one of a set of speakers disposed in a headrest or an open-ear wearable.

According to another aspect, a method for providing augmented audio to users in a vehicle, includes the steps of: receiving a first content signal and a second content signal; driving a plurality of speakers disposed in a perimeter of a cabin of the vehicle with a first array configuration such that a bass content of the first audio signal is produced in a first listening zone within the cabin; and driving the plurality of speakers in accordance with a second array configuration such that a bass content of the second audio signal is produced in a second listening zone within the cabin, wherein in the first listening zone a magnitude of the first bass content is greater than a magnitude of the second bass content and in the second listening zone the magnitude of the second bass content is greater than the magnitude of the first bass content.

In an example, the production of the first bass content is time-aligned, in the first listening zone, with a production of an upper range content of the first content signal by a first binaural device, wherein the production of the second bass content is time-aligned, in the second listening zone, with a production of an upper range content of the second content signal by a second binaural device.

In an example, the time-alignment in at least one of the first listening zone or second listening zone is automatically determined according to at least one microphone signal.

In an example, the method further includes the step of outputting to the first binaural device the first upper range and to the second binaural device the second upper range.

In an example, at least one of the first bass content and the second bass content is received from a first mobile device.

In an example, in the first listening zone, the magnitude of the first bass content exceeds the magnitude of the second bass content by three decibels, wherein, in the second listening zone, the magnitude of the second bass content exceeds the magnitude of the first bass content by three decibels.

In an example, the first listening zone is disposed about a first seating position in the vehicle and the second listening zone is disposed about a second seating position in the vehicle.

In an example, the method further includes the step of adjusting at least one filter of a plurality of filters according to an error signal, the plurality of filters forming the first array configuration and the second array configuration.

In an example, the method further includes the step of selecting a plurality of filters from a stored set of filters according to a parameter representative of a configuration of the vehicle cabin, the plurality of filters forming the first array configuration and the second array configuration.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

A vehicle audio system that includes only perimeter speakers is limited in its ability to provide different audio content to different passengers. While the vehicle audio system can be arranged to provide separate zones of bass content with satisfactory isolation, this cannot be similarly said about upper range content, in which the wavelengths are too short to adequately create separate listening zones with independent content using the perimeter speakers alone.

The leakage of upper-range content between listening zones can be solved by providing each user with a wearable device, such as headphones. If each user is wearing a pair of headphones, a separate audio signal can be provided to each user with minimal sound leakage. But minimal leakage comes at the cost of isolating each passenger from the environment, which is not desirable in a vehicle context. This is particularly true of the driver, who needs to be able to hear sounds in the environment such as those produced by emergency vehicles or the voices of the passengers, but it is also true of the rest of the passengers which typically want to be able to engage in conversation and interact with each other.

This can be resolved by providing each user with a binaural device such as an open-ear wearable or near-field speakers, such as headrest speakers, that provides each passenger with separate upper range audio content while maintaining an open path to the user's ears, allowing users to engage with their environment. But open-ear wearables and near-field speakers typically do not provide adequate bass response in a moving vehicle as the road noise tends to mask the same frequency band.

Figure 1A:
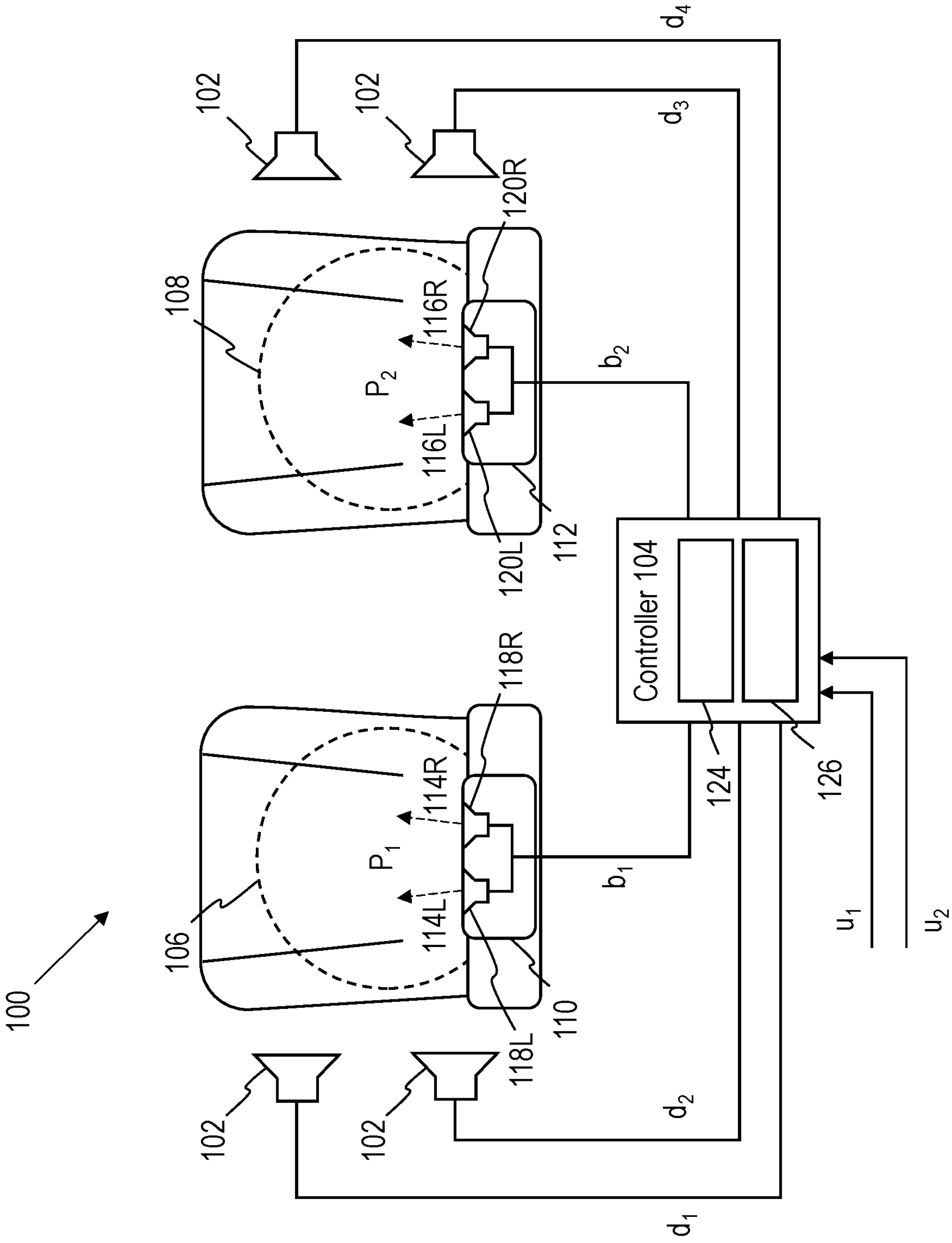
FIG. 1A depicts an audio system for providing augmented audio in a vehicle cabin, according to an example.

Turning now to FIG. 1A there is shown a schematic view representative of the audio system for providing augmented audio in a vehicle cabin 100. As shown, the vehicle cabin 100 includes a set of perimeter speakers 102. (For the purposes of this disclosure a speaker is any device receiving an electrical signal and transducing it into an acoustic signal.) A controller 104, disposed in the vehicle, is configured to receive a first content signal $u_1$ and a second content signal $u_2$. The first content signal $u_1$ and second content signal $u_2$ are audio signals (and can be received as analog or digital signals according to any suitable protocol) that each include a bass content (i.e., content below 250 Hz±150 Hz) and an upper range content (i.e., content above 250 Hz±150 Hz). The controller 104 is configured to drive perimeter speakers 102 with driving signals $d_1$-$d_4$ to form at least a first array configuration and a second array configuration. The first array configuration, formed by at least a subset of perimeter speakers 102, constructively combines the acoustic energy generated by perimeter speakers 102 to produce the bass content of the first content signal $u_1$ in a first listening zone 106 arranged at a first seating position $P_1$. The second array configuration, similarly formed by at least a subset of perimeter speakers 102, constructively combines the acoustic energy generated by perimeter speakers 102 to produce the bass content of the second content signal $u_2$ in a second listening zone 108 arranged at a second seating position $P_2$. Furthermore, the first array configuration can destructively combine the acoustic energy generated by perimeter speakers 102 to form a substantial null at the second listening zone 108 (and any other seating position within the vehicle cabin) and the second array configuration can destructively combine the acoustic energy generated by perimeter speakers 102 to form a substantial null at the first listening zone (and any other seating position within the vehicle cabin).

It should be understood that in various examples there can be some or total overlap between the subsets of perimeter speakers 102 arrayed to produce the bass content of the first content signal $u_1$ in the first listening zone 106 and the subsets of perimeter speakers 102 arrayed to produce the bass content of the second content signal $u_2$ in the second listening zone.

Given a substantially same magnitude of bass content in the first and second content signals, arraying of the perimeter speakers 102 means that the magnitude of the bass content of the first content signal $u_1$ is greater in the first listening zone 106 than the magnitude of the bass content of the second content signal $u_2$. Similarly, the magnitude of the bass content of the second content signal $u_2$ is greater than the magnitude of the bass content of the first content signal $u_1$. The net effect is that a user seated at position $P_1$ primarily perceives the bass content of the first content signal $u_1$ as greater than the bass content of the second content signal $u_2$, which may not be perceived at in some instances. Similarly, a user seated at position $P_2$ primarily perceives the bass content of the second content signal $u_2$ as greater than the bass content of the first content signal $u_1$. In one example, the magnitude of the bass content of the first content signal $u_1$ is greater than the magnitude of the bass content of the second content signal $u_2$ by at least 3 dB in the first listening zone, and, likewise, the magnitude of the bass content of the second content signal $u_2$ is greater than the magnitude of the bass content of the first content signal $u_1$ by at least 3 dB in the second listening zone.

Although only four perimeter speakers 102 are shown, it should be understood that any number of perimeter speakers 102 greater than one can be used. Furthermore, for the purposes of this disclosure the perimeter speakers 102 can be disposed in or on the vehicle doors, pillars, ceiling, floor, dashboard, rear deck, trunk, under seats, integrated within seats, or center console in the cabin 100, or any other drive point in the structure of the cabin that creates acoustic bass energy in the cabin.

In various examples, the first content signal $u_1$ and second content signal $u_2$ (and any other received content signals) can be received from one or more of a mobile device (e.g., via a Bluetooth connection), a radio signal, a satellite radio signal, or a cellular signal, although other sources are contemplated. Furthermore, each content signal need not be received contemporaneously but rather can have been previously received and stored in memory for playback at a later time. Furthermore, as mentioned above, the first content signal $u_1$ and second content signal $u_2$ can be received as an analog or digital signal according to any suitable communications protocol. In addition, because the first content signal $u_1$ and second content signal $u_2$ can be transmitted digitally, which is comprised of a set of binary values, the bass content and upper range content of these signals refers to the constituent signals of the respective frequency ranges of the bass content and upper range content when the content signal is converted into an analog signal before being transduced by a speaker or other device.

As shown in FIG. 1A, binaural devices 110 and 112 are respectively positioned to produce a stereo first acoustic signal 114 in the first listening zone 106 and a stereo second acoustic signal 116 in the second listening zone. As shown in FIG. 1A, binaural device 110 and 112 are comprised of speakers 118, 120 disposed in a respective headrest disposed proximate to listening zones 106, 108. Binaural device 110, for example, comprises left speaker 118L, disposed in a headrest to deliver left-side first acoustic signal 114L to the left ear of a user seated in the first seating position $P_1$ and a right speaker 118R to deliver right-side first acoustic signal 114R to the right ear of the user. In the same way, binaural device 112 comprises left speaker 120L disposed in a headrest to deliver left-side second acoustic signal 116L to the left ear of a user seated in the second seating position $P_2$ and right speaker 120R to deliver right-side second acoustic signal 116R to the right ear of the user. Although the acoustic signals 114, 116 are shown as comprising left and right stereo components, it should be understood that in some examples, one or both acoustic signals 114, 116 could be mono signals, in which both the left side and right side are the same. Binaural device 110, 112 can each further employ a set of cross-cancellation filters that cancel the audio on each respective side produced by opposite side. Thus, for example, binaural device 110 can employ a set of cross-cancellation filters to cancel at the user's left ear audio produced for the user's right ear and vice versa. In examples in which the binaural device is a wearable (e.g., an open-ear headphone) and has drive points close to the ears, crosstalk cancellation is typically not required. However, in the case of headrest speakers or wearables that are further away (e.g., Bose SoundWear), the binaural device would typically employ some measure crosstalk cancellation to achieve binaural control.

Figure 2:
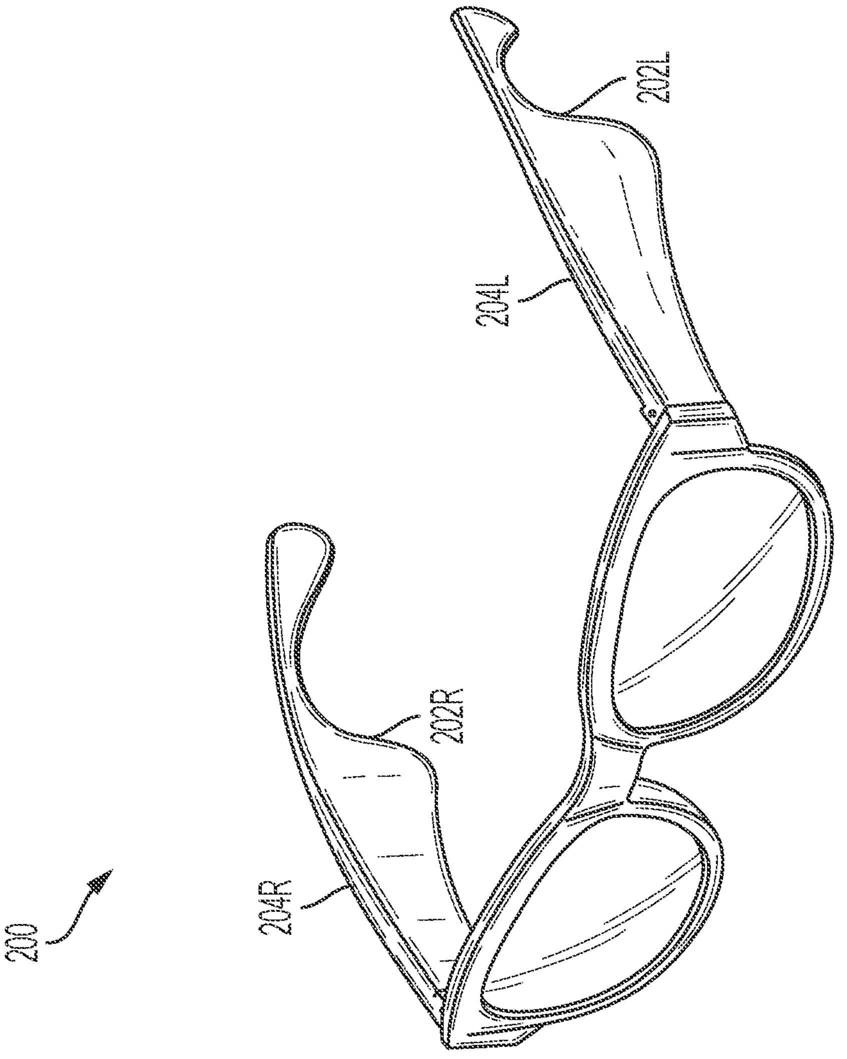
FIG. 2 depicts an open-ear wearable, according to an example.
Figure 3:
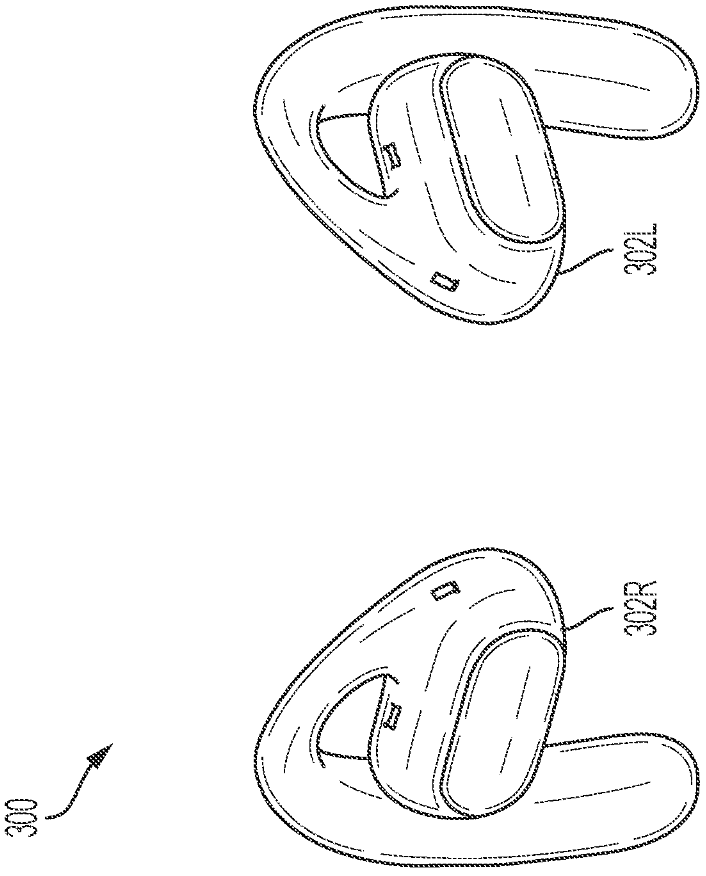
FIG. 3 depicts an open-ear wearable, according to an example.

Although the first binaural device 110 and second binaural device 112 are shown as speakers disposed in a headrest, it should be understood that the binaural devices described in this disclosure can be any device suitable for delivering to the user seated at the respective position, independent left and right ear acoustic signals (i.e., a stereo signal). Thus, in an alternative example, the first binaural device 110 and/or second binaural device 112 could be comprised of speakers located in other areas of vehicle cabin 100 such as the upper seatback, headliner, or any other place that is disposed near to the user's ears, suitable for delivering independent left and right ear acoustic signals to the user. In yet another alternative example, first binaural device 110 and/or second binaural device 112 can be an open-ear wearable worn by the user seated at the respective seating position. For the purposes of this disclosure, an open-ear wearable is any device designed to be worn by a user and being capable of delivering independent left and right ear acoustic signals while maintaining an open path to the user's ear. FIGS. 2 and 3 show two examples of such open ear wearables. The first open ear wearable is a pair of frames 200, featuring a left speaker 202L and a right speaker 202R located in the left temple 204L and right temple 204R, respectively. The second is a pair of open-ear headphones 300 featuring a left speaker 302L and a right speaker 302R. Both frames 200 and open-ear headphones 300 retain an open path to the user's ear, while being able to provide separate acoustic signals to the user's left and right ears.

Controller 104 can provide at least the upper range content of the first content signal $u_1$ via binaural signal $b_1$ to the first binaural device 110 and at least the upper range content of the second signal content signal $u_2$ via binaural signal $b_2$ to the second binaural device 112. (In an example, the entire range, including the bass content, of the first content signal $u_1$ and second content signal $u_2$ is respectively delivered to the first binaural device 110 and second binaural device 112.) As a result, the first acoustic signal 114 comprises at least the upper range content of the first content signal $u_1$ and the second acoustic signal 116 comprises at least the upper range content of the second signal $u_2$. The production of the bass content of the first content signal $u_1$ in the first listening zone 106 by perimeter speaker 102 augments the production of the upper range content of the first signal $u_1$ produced by the first binaural device 110, and the production of the bass content of the second content signal $u_2$ in the second listening zone 108 by perimeter speakers 102 augments the production of the upper range content of the second content signal $u_2$ produced by the second binaural device.

A user seated at seating position $P_1$ thus perceives the first content signal $u_1$ played in the first listening zone 106 from the combined outputs of the first arrayed configuration of perimeter speakers 102 and first binaural device 110. Likewise, the user seated at seating position $P_2$ perceives the second content signal $u_2$ played in the second listening zone 108 from the combined outputs of the second arrayed configuration of perimeter speakers 102 and second binaural device 112.

Figure 7A:
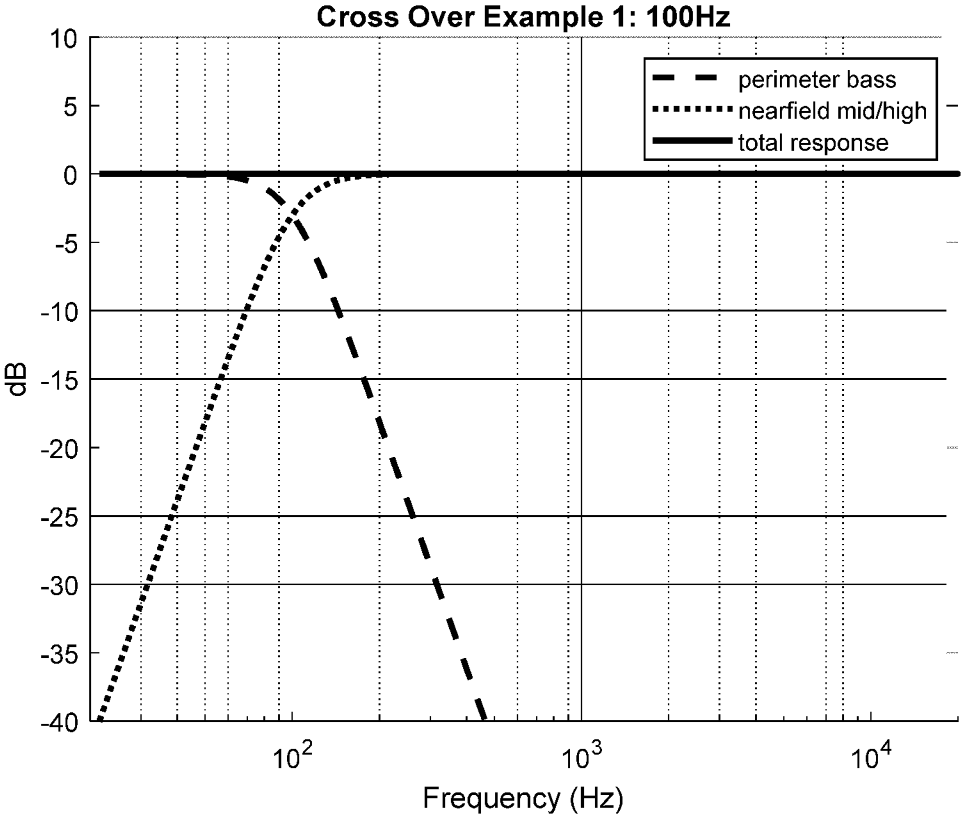
FIG. 7A depicts a cross-over plot according to an example.
Figure 7B:
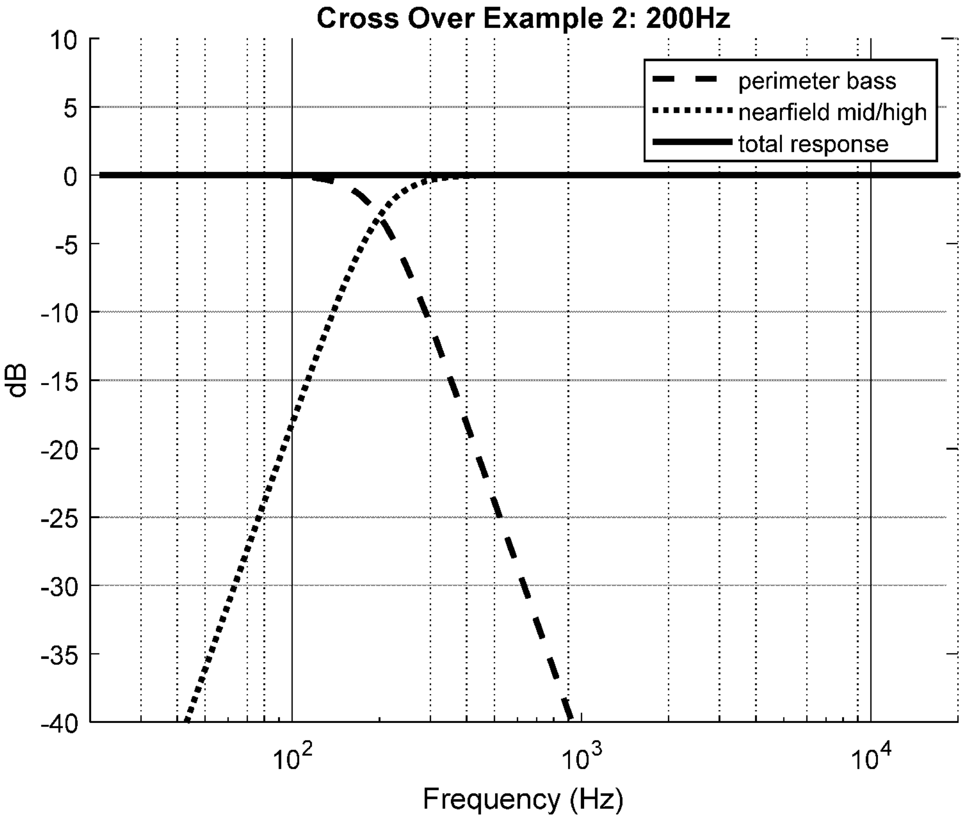
FIG. 7B depicts a cross-over plot according to an example.

FIGS. 7A and 7B depict example plots of frequency cross-over between bass content and upper range content of an example content signal (e.g., first content signal $u_1$) at 100 Hz and 200 Hz respectively. As described above, the cross-over between the bass content and upper range content can occur at, e.g., 250 Hz±150 Hz, thus the crossover 100 Hz or 200 Hz are examples of this range. As shown, the combined total response at the listening zone is perceived to be a flat response. (Of course, the flat response is only one example of a frequency response, and other examples can, e.g., boost the bass, midrange, and/or treble, depending on the desired equalization.)

Binaural signals $b_1$, $b_2$ (and any other binaural signals generated for additional binaural devices) are generally N-channel signals, where N≥2 (as there is at least one channel per ear). N can correlate to the number of speakers in the rendering system (e.g., if a headrest has four speakers, the associated binaural signal typically has four channels). In instances in which the binaural device employs crosstalk cancellation, there may exist some overlap between content in the channels in the for the purposes of cancellation. Typically, though, the mixing of signals is performed by a crosstalk cancellation filter disposed within the binaural device, rather than in the binaural signal received by the binaural device.

Controller 104 can provide binaural signals $b_1$, $b_2$ in either a wired or wireless manner. For example, where binaural device 110 or 112 is an open-ear wearable, the respective binaural signal $b_1$, $b_2$ can be transmitted over Bluetooth, WiFi, or any other suitable wireless protocol.

In addition, controller 104 can be further configured to time-align the production of the bass content in the first listening zone 106 with the production of the upper range content by the first binaural device 110 to account for the wireless, acoustical, or other transmission delays intrinsic to the production of such signals. Similarly, the controller 104 can be further configured to time-align the production of the bass content in the second listening zone 108 with the production of the upper range content by the second binaural device 112. There will be some intrinsic delay between the output of driving signals $d_1$-$d_4$ and the point in time that the bass content, transduced by perimeter speakers 102, arrives at the respective listening zone 106, 108. The delay comprises the time required for driving signal $d_1$-$d_4$ to be transduced by the respective speaker 102 into an acoustic signal, and to travel to the first listening zone 106 or the second listening 108 from the respective speaker 102. (Although it is conceivable that other factors could influence the delays.) Because each perimeter speaker 102 is likely located some unique distance from the first listening zone 106 and the second listening zone 108, the delay can be calculated for each perimeter speaker 102 separately. Furthermore, there will be some delay between outputting binaural signals $b_1$, $b_2$ and the respective production of acoustic signals 114, 116 in the first listening zone 106 and second listening zone 108. This delay will be a function of the time to process the received binaural signal $b_1$, $b_2$ (in the event that the binaural signal is encoded in a communication protocol, such as a wireless protocol, and/or where binaural device performs some additional signal processing) and to transduce the binaural signal $b_1$, $b_2$ into acoustic signals 114, 116, and the time for the acoustic signals 114, 116 to travel to the user seated at position $P_1$, $P_2$ (although, because each binaural device is located relatively near to the user, this is likely negligible). (Again, other factors could influence the delay.) Thus, taking these delays into account, controller 104 can time the production of driving signals $d_1$-$d_4$ and binaural signals $b_1$, $b_2$ such that the production, by perimeter speakers 102, of the bass content of first content signal $u_1$ is time-aligned in the first listening zone 106 with the production, by the first binaural device 110, of the upper range content of the first content signal $u_1$, and the production, by perimeter speakers 102 of the bass content of the second content signal $u_2$ is time-aligned in the second listening zone 108 with the production, by the second binaural device 112, of the upper range of the second content signal $u_2$.

For the purposes of this disclosure, "time-aligned" refers to the alignment in time of the production of the bass content and upper range content of a given content signal at given point in space (e.g., a listening zone), such that, at the given point in space, the content is accurately reproduced. It should be understood that the bass content and upper range content need only be time aligned to a degree sufficient for a user to perceive the content signal is accurately reproduced. Generally, an offset of 90° at the crossover frequency between the bass content and upper range content is acceptable in a time-aligned acoustic signal. To provide a couple of examples at several different crossover frequencies, an acceptable offset could be +/−2.5 ms for 100 Hz, +/−1.25 ms for 200 Hz, +/−1 ms for 250 Hz, and +/−0.625 ms for 400 Hz. However, it should be understood that, for the purposes of this disclosure, anything up to a 180° offset at the crossover frequency is considered time aligned.

As shown in FIGS. 7A and 7B, there is additional overlap between the bass content and upper range content beyond the cross-over frequency. The phase of these frequencies within the overlap can be individually shifted to align the upper range content and bass content in time; as will be understood, the phase shift applied will be dependent on frequency. For example, one or more all-pass filters can be included, designed to introduce a phase shift, at least to the overlapping frequencies of the upper range content and the bass content, in order to achieve the desired time-alignment across frequency.

The time alignment can be a priori established for a given binaural device. In the example of headrest speakers, the delay between receiving the binaural signal and producing the acoustic signal will always be the same and the delays can thus be set as a factory setting. However, where the binaural device 110, 112 is a wearable, the delay will typically vary from wearable to wearable, based on the varied times required to process the respective binaural signal $b_1$, $b_2$, and to produce the acoustic signal 114, 116 (this is especially true in the case of wireless protocols which have notoriously variable latency). Accordingly, in one example, controller 104 can store a plurality of delay presets for time-aligning the production of the bass content with the production of the acoustic signal 114, 116 for various wearable devices or types of wearable devices. Thus, when controller 104 connects to a particular wearable device it can identify the wearable (e.g., a pair of Bose Frames) and retrieve from storage a particular prestored delay for time-aligning the bass content with acoustic signal 114, 116 produced by the identified wearable. In an alternative example, a prestored delay can be associated with a particular device type. For example, if the delays associated with wearables operating a particular communication protocol (e.g., Bluetooth) or protocol version (e.g., a Bluetooth version) are typically the same, controller 104 can select delay according to the detected communication protocol or communication protocol version. These prestored delays for a given device or type of device can be determined by employing a microphone at a given listening zone and calibrating the delay, manually or by an automated process, until the bass content of a given content signal is time-aligned with the acoustic signal of a given binaural device at the listening zone. In yet another example, the delays can be calibrated according to a user input. For example, a user wearing the open-ear wearable can sit in a seating position $P_1$ or $P_2$ and adjust the production of drive signal $d_1$-$d_4$ and/or binaural signals $b_1$, $b_2$ until the bass content is correctly time-aligned with the upper range of acoustic signal 114, 116. In another example, the device can report to controller 104 a delay necessary for time-alignment.

In alternative examples, the time alignment can be determined automatically during runtime, rather than by a set of prestored delays. In an example, a microphone can be disposed on or near the binaural device (e.g., on a headrest or on the wearable) and used to produce a signal to the controller to determine the delay for time alignment. One method for automatically determining time-alignment is described in US 2020/0252678, titled "Latency Negotiation in a Heterogeneous Network of Synchronized Speakers" the entirety of which is herein incorporated by reference, although any other suitable method for determining delay can be used.

As described above, the time alignment can be achieved across a range of frequencies using an all-pass filter(s). To account for the different delays of various binaural devices, the particular filter(s) implemented can be selected from a set of stored filters, or the phase change implemented by the all-pass filter(s) can be adjusted. The selected filter or the phase change can, as described above, be based upon different devices or device types, by a user input, according to a delay detected by microphones on the wearable device, according to a delay reported by the wearable device, etc.

Figure 1B:
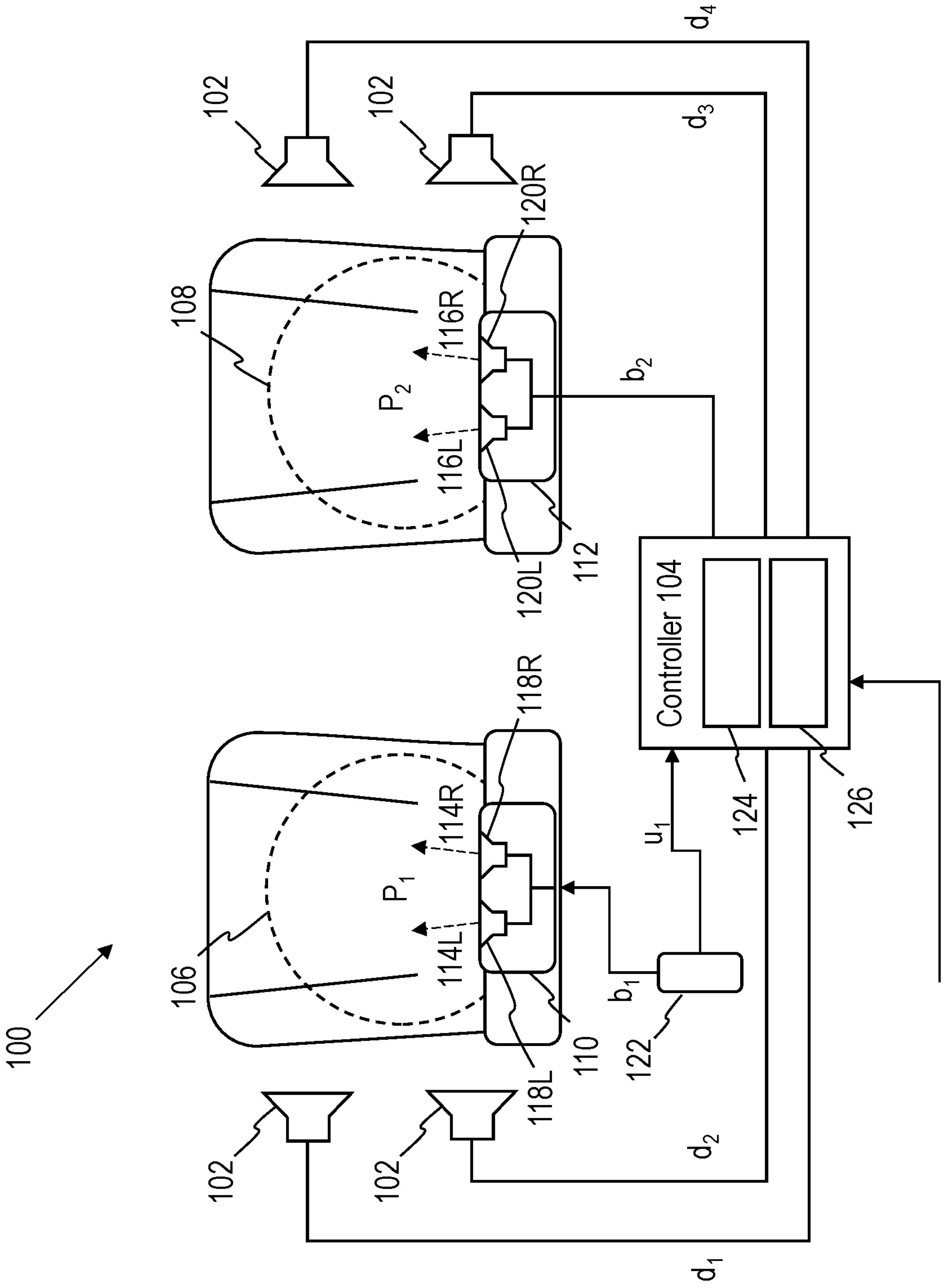
FIG. 1B depicts an audio system for providing augmented audio in a vehicle cabin, according to an example.

In the example of FIG. 1A, controller 104 generates both driving signals $d_1$-$d_4$ and binaural signal $b_1$, $b_2$. In alternative example, however, one or more mobile devices can provide the binaural signals $b_1$, $b_2$. For example, as shown in FIG. 1B, a mobile device 122 provides binaural signal $b_1$ to binaural device 110 (e.g., where the binaural device 110 is an open-ear wearable) via a wired or wireless (e.g., Bluetooth) connection. For example, a user can enter the vehicle cabin 100 wearing the open-ear wearable binaural device 110 and listening to music via a paired Bluetooth connection (binaural signal $b_1$) with mobile device 122. Upon entering vehicle cabin 100, controller 104 can begin to provide the bass content of first content signal $u_1$ while mobile device 122 continues to provide binaural signal $b_1$ to the open ear wearable binaural device 110. In this example, controller 104 can receive from the mobile device 122 first content signal $u_1$ in order to produce the bass content of first content signal $u_1$ in the first listening zone 106. Thus, mobile device 122 can pair with (or otherwise be connected to) both binaural device 110 and controller 104 to provide binaural signal $b_1$ and first content signal $u_1$. In an alternative example, mobile device 122 can broadcast a single signal that is received by both controller 104 and binaural device 110 (in this example, each device can apply a respective high-pass/low-pass for crossover). For example, the Bluetooth 5.0 standard provides such an isochronous channel for locally broadcasting a signal to nearby devices. In an alternative example, rather than transmitting first content signal $u_1$, mobile device 122 can transmit to controller 104 metadata of the content transmitted to the first binaural device 110 by first binaural signal $b_1$, allowing controller 104 to source the correct first content signal $u_1$ (i.e., the same content) from an outside source such as a streaming service.

While only one mobile device 122 is shown in FIG. 1B, it should be understood that any number of mobile devices can provide binaural signals to any number of binaural devices (e.g., binaural devices 110, 112) disposed in the vehicle cabin 100.

Of course, as described in connection with FIG. 1A, controller 104 can receive first content signal $u_1$ from a mobile device. Thus, in one example, a user can be wearing open-ear wearable first binaural device 110 when entering the vehicle, at which time, the mobile device 122 ceases transmitting content to the first binaural device and instead provides first content signal $u_1$ to controller 104 which assumes transmitting binaural signal $b_1$, e.g., through a wireless connection such as Bluetooth. Similarly, for multiple binaural devices (e.g., binaural devices 110, 112), receiving signals from multiple mobile devices, controller 104 can assume transmitting a respective binaural signal (e.g., binaural signals $b_1$, $b_2$) to the binaural device, rather than the mobile device.

Controller 104 can comprise a processor 124 (e.g., a digital signal processor) and a non-transitory storage medium 126 storing program code that, when executed by processor 124, carries out the various functions and methods described in this disclosure. It should, however, be understood that, in some examples, controller 104, can be implemented as hardware only (e.g., as an application-specific integrated circuit or field-programmable gate array) or as some combination of hardware, firmware, and software.

In order to array perimeter speakers 102 to provide bass content to first listening zone 106 and second listening zone 108, controller 104 can implement a plurality of filters that each adjust the acoustic output of perimeter speakers 102 so that the bass content of the first content signal $u_1$ constructively combines at the first listening zone 106 and the bass content of the second signal $u_2$ constructively combines at the second listening zone 108. While such filters are normally implemented as digital filters, these filters could alternatively be implemented as analog filters.

In addition, although only two listening zones 106 and 108 are shown in FIGS. 1A and 1B, it should be understood that controller 104 can receive any number of content signals and create any number of listening zones (including only one) by filtering the content signals to array perimeter speakers, each listening zone receiving the bass content of a unique content signal. For example, in a five-seat car, the perimeter speakers can be arrayed to produce five separate listening zones, each producing the bass content of a unique content signal (i.e., in which the magnitude of the bass content for the respective content signal is loudest, assuming that the bass contents of each content signal are played at substantially equal magnitude in other listening zone). Furthermore, a separate binaural device can be disposed at each listening zone and receive a separate binaural signal, augmented by and time-aligned with the bass content produced in the respective listening zone.

In the above examples, binaural devices 110, 112 (or any other binaural devices) can deliver to both users the same content. In this example, controller 104 can augment the acoustic signal produced by the binaural devices with bass content produced by perimeter speakers 102 without creating separate listening zones for playing separate content. The bass content can be time-aligned with the upper range content played from both binaural devices 110, 112, thus both users perceive the played content signal, including the upper range signal delivered by the binaural devices 110, 112 and the bass content played by perimeter speakers 102. Although each device receives the same program content signal, it is conceivable that the user would select different volume levels of the same content. In this case, rather than creating separate listening zones, controller 104 can employ the first array configuration and second array configuration to create separate volume zones, in which each user perceives the same program content at different volumes.

In an example, it is not necessary that each user have an associated binaural device, rather some users can listen only to the content produced by the perimeter speakers 102. For this example, the perimeter speakers 102 would produce not only the bass content, but also the upper range content of the program content signal (e.g., program content signal $u_1$). For the user's with binaural devices, the program content signal is perceived as a stereo signal, as provided for by the binaural signal (e.g., binaural signal $b_1$) and by virtue of the left and right speakers of the binaural device. Indeed, it should be understood that, in each of the examples described in this disclosure, there may be some or complete overlap in spectral range between the signals produced by the perimeter speakers 102 and the binaural devices (e.g., binaural devices 110, 112). Those with binaural devices having an overlap in spectral range with the perimeter speakers 102 receive an enhanced experience with improved stereo, audio staging, and perceived spaciousness.

It should be understood that navigation prompts and phone calls are among the program content signals that can be directed toward particular users in listening zones. Thus, a driver can hear navigation prompts produced by a binaural device (e.g., binaural device 110) with bass augmented by the perimeter speakers while the passengers listen to music in a different listening zone.

In addition, the microphones on wearable binaural devices can be used for voice pick-up, for traditional uses such as phone call, vehicle-based or mobile device-based voice recognition, digital assistants, etc.

Further, rather than one set of filters, a plurality of filters can be implemented by controller 104 depending on the configuration of the vehicle cabin 100. For example, various parameters within the cabin will change the acoustics of the vehicle cabin 100, including, the number of passengers in the vehicle, whether the windows are rolled up or down, the position of the seats in the vehicle (e.g., whether the seats are upright or reclined or moved forward or back in the vehicle cabin), etc. These parameters can be detected by controller 104 (e.g., by receiving a signal from the vehicles on-board computer) and implement the correct set of filters to provide the first, second, and any additional arrayed configurations. Various sets of filters, for example, can be stored in memory 126 and retrieved according to the detected cabin configuration.

In an alternative example, the filters can be a set of adaptive filters that are adjusted according to a signal received from an error microphone (e.g., disposed on binaural device or otherwise within a respective listening zone) in order to adjust the filter coefficients to align the first listening zone over a respective seating position (first seating position $P_1$ or second seating position $P_2$), or to adjust for changing cabin configurations, such as whether the windows are rolled up or down.

Figure 4:
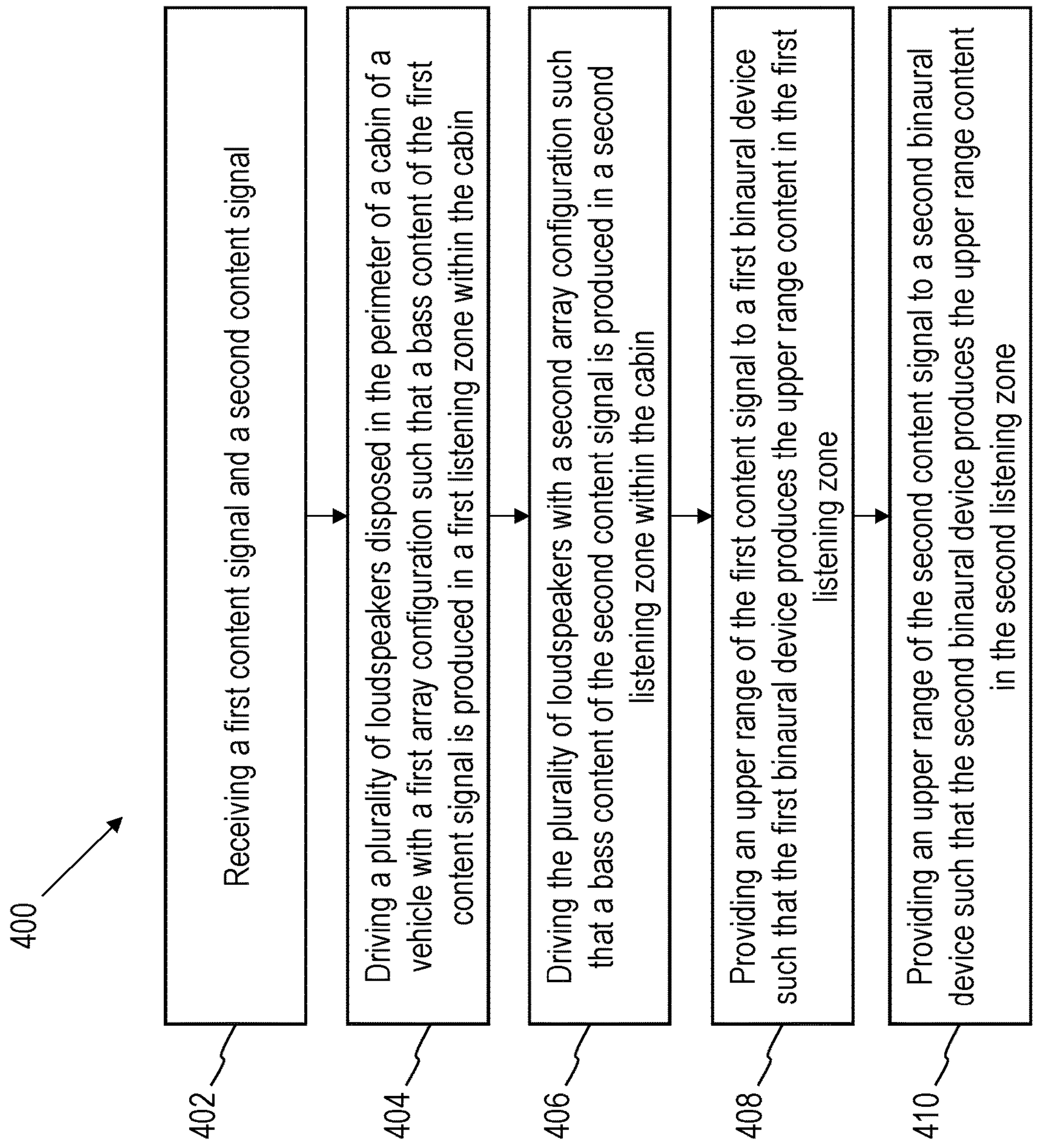
FIG. 4 depicts a flowchart of a method for providing augmented audio in a vehicle cabin, according to an example.

FIG. 4 depicts a flowchart for a method 400 of providing augmented audio to users in a vehicle cabin. The steps of method 400 can be carried out by a controller (such as controller 104) in communication with a set of perimeter speakers (such as perimeter speakers 102) disposed in a vehicle and further in communication with a set of binaural devices (such as binaural device 110, 112) disposed at respective seating positions within the vehicle.

At step 402 a first content signal and second content signal are received. These content signals can be received from multiple potential sources such as mobile devices, radio, satellite radio, a cellular connection, etc. The content signals each represent audio that may include a bass content and an upper range content.

At steps 404 and 406 a plurality of perimeter speakers are driven in accordance with a first array configuration (step 404) and a second array configuration (step 406) such that the bass content of the first content signal is produced in a first listening zone and the bass content of the second content signal is produced in a second listening zone in the cabin. The nature of the arraying produces listening zones such that, when the bass content of the first content signal is played in the first listening zone at the same magnitude as the bass content of the second signal is played in the second listening zone, the magnitude of the bass content of the first content signal will be greater than the magnitude of the bass content of the second content signal (e.g., by at least 3 dB) in the first listening zone, and the magnitude of the bass content of the second signal will be greater than the magnitude of the bass content of the first content signal (e.g., by at least 3 dB) in the second listening zone. In this way, a user seated at the first seating position will perceive the magnitude of the first bass content as greater than the second bass content. Likewise, a user seated at the second seating position will perceive the magnitude of the second bass content as greater than the first bass content.

At steps 408 and 410 the upper range content of the first content signal is provided to a first binaural device positioned to produce the upper range content in the first listening zone (step 408) and the upper range content of the second content signal is provided to a second binaural device positioned to produce the upper range content in the second listening zone (step 410). The net result is a user seated at the first seating position perceives the first content signal from the combination of outputs of the first binaural device and the perimeter speakers and a user seated at the second seating position perceives the second content signal from the combination of outputs of the second binaural device and the perimeter speakers. Stated differently, the perimeter speakers augment the upper range of the first content signal as produced by the first binaural device with the bass of the first content signal in the first listening zone, and augment the upper range of the second content signal as produced by the second binaural signal with the bass of the second content signal in the second listening zone. In various alternative examples, the first binaural device is an open-ear wearable or speakers disposed in a headrest.

Furthermore, the production of the bass content of the first content signal in the first listening zone can be time-aligned with the production of the upper range of the first content signal by the first binaural device in the first listening zone and the production of the second bass content in the second listening zone can be time-aligned with the production of the upper range of the second content signal by the second binaural device. In an alternative example, the first upper range content or second upper range content can be provided to the first binaural device or second binaural device by a mobile device, with which the production of the bass content is time-aligned.

Although method 400 is described for two separate listening zones and two binaural devices, it should be understood that method 400 can be extended to any number of listening zones (including only one) disposed within the vehicle and at which a respective binaural device is disposed. In the case of a single binaural device and listening zone, isolation to other seats is no longer important and the plurality of perimeter speaker filters can be different from the multi-zone case in order to optimize for bass presentation. (The case of a single user can, for example, be determined by a user interface or through sensors disposed in the seats.)

Figure 5:
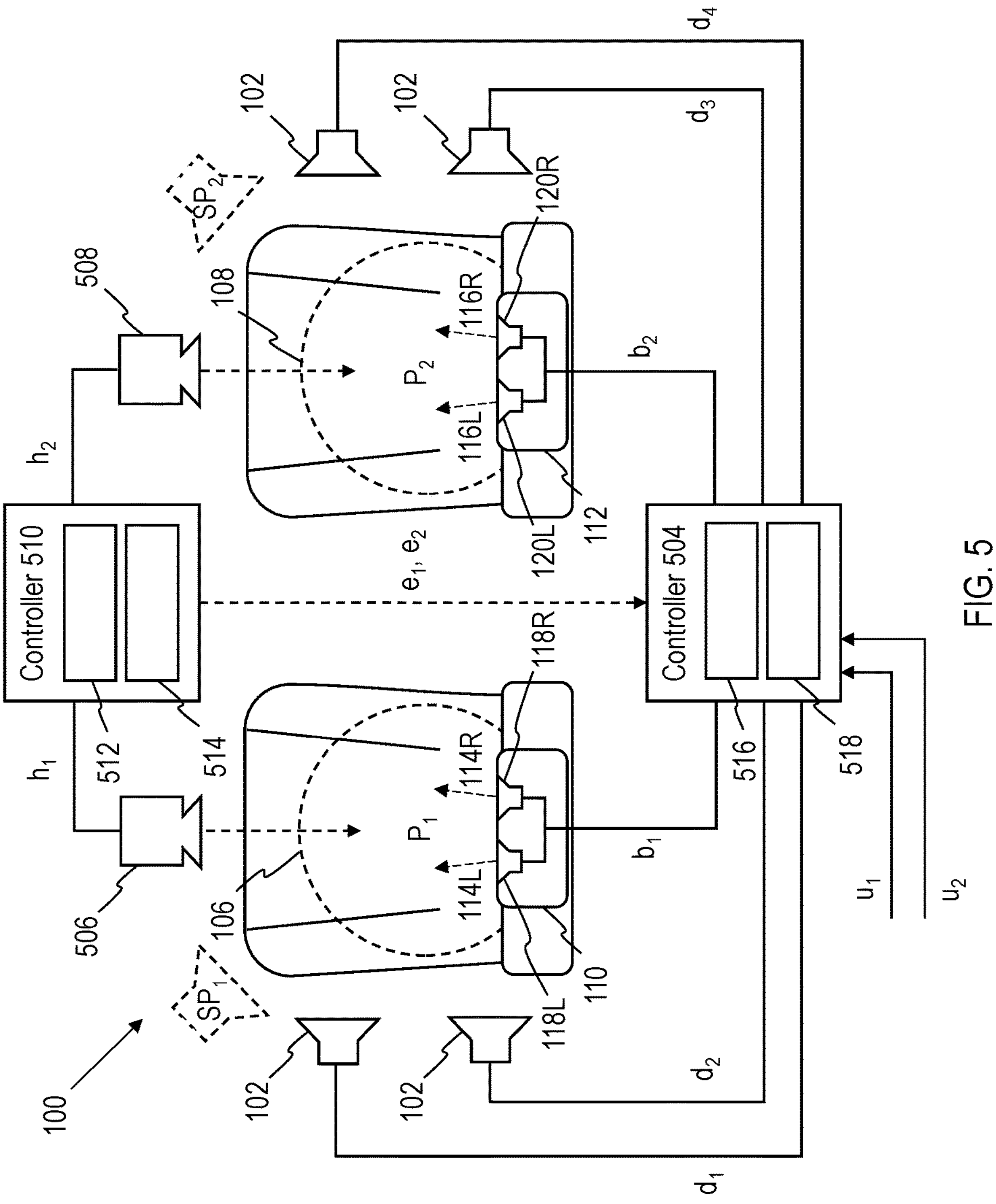
FIG. 5 depicts an audio system for providing augmented spatialized audio in a vehicle cabin, according to an example.

Turning now to FIG. 5 there is shown an alternative schematic of a vehicle audio system disposed in a vehicle cabin 100, in which perimeter speakers 102 are employed to augment the bass content of at least one binaural device producing spatialized audio. In this example, controller 504 (an alternative example of controller 104) is configured to produce binaural signals $b_1$, $b_2$ as spatial audio signals that cause binaural device 110 and 112 to produce acoustic signals 114, 116 as spatial acoustic signals, perceived by a user as originating from a virtual audio source, $SP_1$ and $SP_2$ respectively. Binaural signal $b_1$ is produced as spatial audio signals according to the position of the head of a user seated at position $P_1$. Similarly, binaural signal $b_2$ is produced as spatial audio signals according to the position of the head of a user seated at position $P_2$. Similar to the example of FIGS. 1A and 1B, these spatialized acoustic signals, produced by binaural devices 110, 112, can be augmented by bass content produced by the perimeter speakers 102 and driven by controller 504.

As shown in FIG. 5, a first headtracking device 506 and a second headtracking device 508 are disposed to respectively detect the position of the head of a user seated at seating position $P_1$ and a user seated at seating position $P_2$. In various examples, the first headtracking device 506 and second headtracking device 508 can be comprised of a time-of-flight sensor configured to detect the position of a user's head within the vehicle cabin 100. However, a time-of-flight sensor is only possible example. Alternatively, multiple 2D cameras that triangulate on the distance from one of the camera focal points using epi-polar geometry, such as the eight-point algorithm, can be used. Alternatively, each headtracking device can comprise a LIDAR device, which produces a black and white image with ranging data for each pixel as one data set. In alternative examples, where each user is wearing an open-ear wearable, the headtracking can be accomplished, or may be augmented, by tracking the respective position of the open-ear wearable on the user, as this will typically correlate to the position of the user's head. In still other alternative examples, capacitive sensing, inductive sensing, inertial measurement unit tracking in combination with imaging, can be used. It should be understood that the above-mentioned implementations of headtracking device are meant to convey that a range of possible devices and combinations of devices might be used to track the location of a user's head.

For the purposes of this disclosure, detecting the position of a user's head can comprise detecting any part of the user, or of a wearable worn by the user, from which the position of the center of user's cranium can be derived. For example, the location of the user's ears can be detected, from which a line can be drawn between the tragi to find the middle in approximation of the finding the center. Detecting the position of the user's head can also including detecting the orientation of the user's head, which can be derived according to any method for finding the pitch, yaw, and roll angles. Of these, the yaw is particularly important as it typically affects the ear distance to each binaural speaker the most.

First headtracking device 506 and second headtracking device 508 can be in communication with a headtracking controller 510 which receives the respective outputs $h_1$, $h_2$ of first headtracking device 506 and second headtracking device 508 and determines from them the position of the user's head seated at position $P_1$ or position $P_2$, and generates an output signal to controller 504 accordingly. For example, headtracking controller 510 can receive raw output data $h_1$ from first headtracking device 506, interpret the position of the head of a user seated at position $P_1$ and output a position signal $e_1$ to controller 504 representing the detected position. Likewise, headtracking controller 510 can receive output data $h_2$ from second headtracking device 508 and interpret the position of the head of a user seated at seating position $P_2$ and output a position signal $e_2$ to controller 504 representing the detected position. Position signals $e_1$ and $e_2$ can be delivered real-time as coordinates that represent the position of the user's head (e.g., including the orientation as determined by pitch, yaw, and roll).

Controller 510 can comprise a processor 512 and non-transitory storage medium 514 storing program code that, when executed by processor 512 performs the various functions and methods disclosed herein for producing the position signal, including receiving the output signal of each headtracking device 506, 508 and for generating the position signal $e_1$, $e_2$ to controller 104. In an example, controller 510 can determine the position of user's head through stored software or with a neural network that has been trained to detect the position of the user's head according to the output of a headtracking device. In an alternative example, each headtracking device 506, 130, can comprise its own controller for carrying out the functions of controller 510. In yet another example, controller 504 can receive the outputs of headtracking devices 506, 508 directly and perform the processing of controller 510.

Controller 504, receiving the position signal $e_1$ and/or $e_2$ can generate binaural signal $b_1$ and/or $b_2$ such that at least one of binaural device 110, 112 generates an acoustic signal that is perceived by a user as originating at some virtual point in space within the vehicle cabin 100 other than the actual location of the speakers (e.g., speakers 118, 120) generating the acoustic signal. For example, controller 504 can generate a binaural signal $b_1$ such that binaural device 110 generates an acoustic signal 114 perceived by a user seated at seating position $P_1$ as originating at spatial point $SP_1$ (represented in FIG. 5 in dotted lines as this is a virtual sound source). Similarly, controller 504 can generate a binaural signal $b_2$ such that binaural device 112 generates an acoustic signal 116 perceived by a user seated at seating position $P_2$ as originating at spatial point $SP_2$. This can be accomplished by filtering and/or attenuating the binaural signals $b_1$, $b_2$ according to a plurality of head-related transfer functions (HRTFs) which adjust acoustic signals 114, 116 to simulate sound from the virtual spatial point (e.g., spatial point $SP_1$, $SP_2$). As the signals are binaural, i.e., relate to both of the listener's ears, the system can utilize one or more HRTFs to simulate sound specific to various locations around the listener. It should be appreciated that the particular left and right HRTFs used by the controller 504 can be chosen based on a given combination of azimuth angle and elevation detected between the relative position of the user's left and right ears and the respective spatial position $SP_1$, $SP_2$. More specifically, a plurality of HRTFs can be stored in memory and be retrieved and implemented according to the detected position of the user's left and right ears and selected spatial position $SP_1$, $SP_2$. However, it should be understood that, where binaural device 110, 112 is an open-ear wearable, the location of the user's ears can be substituted for or determined from the location of the open-ear wearable.

Although two different spatial points $SP_1$, $SP_2$ are shown in FIG. 5, it should be understood that the same spatial point can be used for both binaural devices 110, 112. Furthermore, for a given binaural device, any point in space can be selected as the spatial point from which to virtualize the generated acoustic signals. (The selected point in space can be a moving point in space, e.g., to simulate an audio-generating object in motion.) For example, left, right, or center channel audio signals can be simulated as though they were generated at a location proximate the perimeter speakers 102. Furthermore, the realism of the simulated sound may be enhanced by adding additional virtual sound sources at positions within the environment, i.e., vehicle cabin 100, to simulate the effects of sound generated at the virtual sound source location being reflected off of acoustically reflective surfaces and back to the listener. Specifically, for every virtual sound source generated within the environment, additional virtual sound sources can be generated and placed at various positions to simulate a first order and a second order reflection of sound corresponding to sound propagating from the first virtual sound source and acoustically reflecting off of a surface and propagating back to the listener's ears (first order reflection), and sound propagating from the first virtual sound source and acoustically reflecting off a first surface and a second surface and propagating back to the listener's ears (second order reflection). Methods of implementing HRTFs and virtual reflections to create spatialized audio are discussed in greater detail in U.S. Pat. Pub. US2020/0037097A1 titled "Systems and methods for sound source virtualization," the entirety of which is incorporated by reference herein. In an example, the virtual sound source can be located outside the vehicle. Likewise, the first order reflections and second order reflections need not be calculated for the actual surfaces within the vehicle, but rather than can be calculated for virtual surfaces outside the vehicle, to for example, create the impression that the user is in a larger area than the cabin, or at least to optimize the reverb and quality of the sound for an environment that is better than the cabin of the vehicle.

Controller 504 is otherwise configured in the manner of controller 104 described in connection with FIGS. 1A and 1B, which is to say that the spatialized acoustic signals 114, 116 can be augmented (e.g., in a time-aligned manner), with bass content produced by perimeter speakers 102. For example, perimeter speakers 102 can be utilized to produce the bass content of first content signal $u_1$, the upper range content of which is produced by binaural device 110 as a spatialized acoustic signal, perceived by the user at seating position $P_1$ to originate at spatial position $SP_1$. Although the bass content produced by perimeter speakers 102 in first listening zone 106 may not be a stereo signal, the user seated at seating position $P_1$ may still perceive the first content signal $u_1$ as originating from spatial position $SP_1$. Likewise, perimeter speakers can augment the bass content of the second content signal $u_2$—the upper range of which being produced by binaural device 112 as a spatial acoustic signal—in the second listening zone. The user at seating position $P_2$ will perceive the second content signal $u_2$ as originating as spatial position $SP_2$ at the second listening zone with the bass content provided as a mono acoustic signal from perimeter speakers 102.

Although two binaural devices 110, 112 are shown in FIG. 5, it should be understood that only a single spatialized binaural signal (e.g., binaural signal $b_1$) can be provided to one binaural device. Furthermore, it is not necessary that each binaural device provide a spatialized acoustic signal; rather one binaural device (e.g., binaural device 110) can provide a spatialized acoustic signal while another (e.g., binaural device 112) can provide a non-spatialized acoustic signal. Furthermore, as mentioned above, each binaural device can receive the same binaural signal such that each user hears the same content, the bass content of which is augmented by the perimeter speakers 102 (which does not necessarily have to be produced in separate listening zones). Further, the example of FIG. 5 can be extended to any number of listening zones and any number of binaural devices.

Controller 504 can further implement an upmixer, which receives for example, left and right program content signals and generates left, right, center, etc. channels within the vehicle. The spatialized audio, rendered by binaural devices (e.g., binaural devices 110, 112) can be leveraged to enhance the user's perception of the source of these channels. Thus, in effect, multiple virtual sound sources can be selected to accurately create impressions of left, right, center, etc., audio channels.

Figure 6:
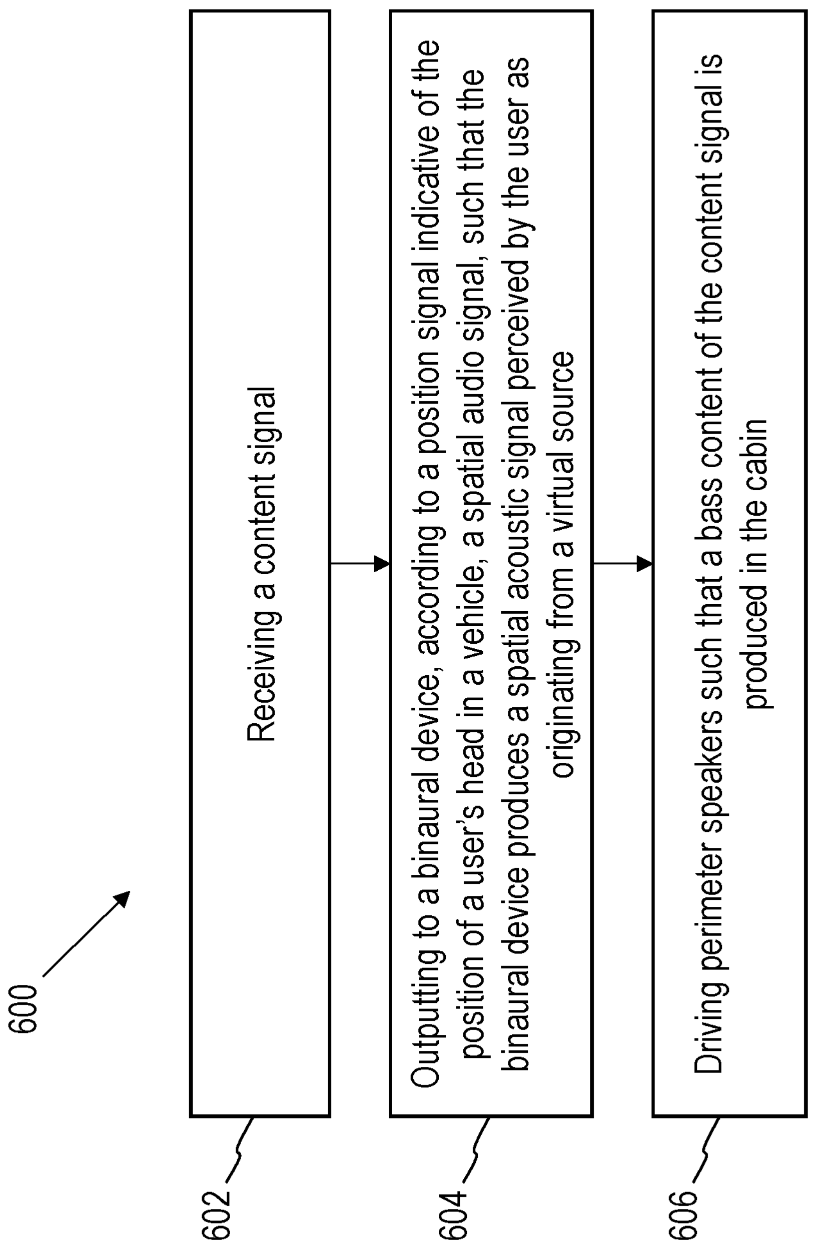
FIG. 6 depicts a flowchart of a method for providing augmented spatialized audio in a vehicle cabin, according to an example.

FIG. 6 depicts a flowchart for a method 600 of providing augmented audio to users in a vehicle cabin. The steps of method 600 can be carried out by a controller (such as controller 504) in communication with a set of perimeter speakers disposed in a vehicle (such as perimeter speakers 102) and further in communication with a set of binaural devices (such as binaural device 110, 112) disposed at respective seating positions within the vehicle.

At step 602, a content signal is received. The content signal can be received from multiple potential sources such as mobile devices, radio, satellite radio, a cellular connection, etc. The content signal is an audio signal that includes a bass content and an upper range content.

At step 604, a spatial audio signal is output to a binaural device according to a position signal indicative of the position of a user's head in a vehicle, such that the binaural device produces a spatial acoustic signal perceived by the user as originating from a virtual source. The virtual source can be a selected position within the vehicle cabin, such as, in an example, near to the perimeter speakers of vehicle. This can be accomplished by filtering and/or attenuating the audio signal output to the binaural device according to a plurality of head-related transfer functions (HRTFs) which adjust acoustic signals to simulate sound from the virtual source (e.g., spatial point $SP_1$, $SP_2$). As the signals are binaural, i.e., relate to both of the listener's ears, the system can utilize one or more HRTFs to simulate sound specific to various locations around the listener. It should be appreciated that the particular left and right HRTFs used can be chosen based on a given combination of azimuth angle and elevation detected between the relative position of the user's left and right ears and the respective spatial position. More specifically, a plurality of HRTFs can be stored in memory and be retrieved and implemented according to the detected position of the user's left and right ears and selected spatial position.

The user's head position can be determined according to the output of a headtracking device (such as headtracking device 506, 508), which can be comprised of, for example, a time-of-flight sensor, a LIDAR device, multiple two-dimensional cameras, wearable-mounted inertial motion units, proximity sensors, or a combination of these components. In addition, other suitable devices are contemplated. The output of the headtracking device can be processed through a dedicated controller (e.g., controller 510) which can implement software or a neural network trained to detect the position of the user's head.

At step 606, the perimeter speakers are driven such that the bass content of the content signal is produced in the cabin. In this way, the spatial acoustic signal produced by the binaural device is augmented by the perimeter speakers in the vehicle cabin. Detecting the position of a user's head can comprise detecting any part of the user, or of a wearable worn by the user, from which the respective positions of the user's ears or the position of wearable worn by the user can be derived, including detecting the position of the user's ears directly or the position of the wearable directly.

While method 600 describes a method for augmenting the a spatial acoustic signal provided by a single binaural device, method 600 can be extended to augmenting the multiple content signals provided by multiple binaural devices by arraying the perimeter speakers to produce the bass content of respective content signals in different listening zones throughout the cabin. The steps of such a method are described in method 400 and in connection with FIGS. 1A and 1B.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A system for providing augmented audio in a vehicle, comprising:

a plurality of speakers disposed in a perimeter of a cabin of the vehicle; and a controller configured to receive a first content signal and a second content signal, and to drive the plurality of speakers in accordance with a first array configuration, the first array configuration constructively and destructively combining outputs of at least a subset of the plurality of speakers such that a first bass content of the first content signal is produced in a first listening zone within the cabin, and to drive the plurality of speakers in accordance with a second array configuration the second array configuration constructively and destructively combining outputs of at least a subset of the plurality of speakers such that a second bass content of the second content signal is produced in a second listening zone within the cabin, wherein in the first listening zone a magnitude of the first bass content is greater than a magnitude of the second bass content and in the second listening zone the magnitude of the second bass content is greater than the magnitude of the first bass content wherein the controller is further configured to output to a first binaural device a first upper range content of the first content signal and to a second binaural device a second upper range content of the second content signal.

2. The system of claim 1, wherein the controller is configured to time-align, in the first listening zone, the production of the first bass content with the production of the first upper range content of the first content signal by the first binaural device and to time-align, in the second listening zone, the production of the second bass content with a production of an upper range content of the second content signal by the second binaural device.

3. The system of claim 2, wherein the time-alignment in at least one of the first listening zone or second listening zone is automatically determined according to at least one microphone signal.

4. The system of claim 1, wherein the controller is configured to receive at least one of the first bass content and the second bass content from a first mobile device.

5. The system of claim 1, wherein, in the first listening zone, the magnitude of the first bass content exceeds the magnitude of the second bass content by three decibels, wherein, in the second listening zone, the magnitude of the second bass content exceeds the magnitude of the first bass content by three decibels.

6. The system of claim 1, wherein the controller forms the first array configuration and the second array configuration by implementing a plurality of filters, wherein the controller is configured to adjust at least one of the plurality of filters in accordance with an error signal.

7. The system of claim 1, wherein the controller forms the first array configuration and the second array configuration by implementing a plurality of filters, wherein the plurality of filters are selected from a stored set of filters according to a parameter representative of a configuration of the cabin.

8. The system of claim 1, wherein the first binaural device and the second binaural device are each selected from one of a set of speakers disposed in a headrest or an open-ear wearable.

9. A method for providing augmented audio to users in a vehicle, comprising the steps of:

receiving a first content signal and a second content signal;

driving a plurality of speakers disposed in a perimeter of a cabin of the vehicle with a first array configuration, the first array configuration constructively and destructively combining outputs of at least a subset of the plurality of speakers such that a first bass content of the first content signal is produced in a first listening zone within the cabin;

driving the plurality of speakers in accordance with a second array configuration, the second array configuration constructively and destructively combining outputs of at least a subset of the plurality of speakers such that a second bass content of the second content signal is produced in a second listening zone within the cabin, wherein in the first listening zone a magnitude of the first bass content is greater than a magnitude of the second bass content and in the second listening zone the magnitude of the second bass content is greater than the magnitude of the first bass content; and outputting to a first binaural device a first upper range content of the first content signal and to a second binaural device a second upper range content of the second content signal.

10. The method of claim 9, wherein the production of the first bass content is time-aligned, in the first listening zone, with a production of the first upper range content of the first content signal by the first binaural device, wherein the production of the second bass content is time-aligned, in the second listening zone, with a production of the second upper range content of the second content signal by the second binaural device.

11. The method of claim 10, wherein the time-alignment in at least one of the first listening zone or second listening zone is automatically determined according to at least one microphone signal.

12. The method of claim 10, wherein at least one of the first bass content and the second bass content is received from a first mobile device.

13. The method of claim 10, wherein the first binaural device and the second binaural device are each selected from one of a set of speakers disposed in a headrest or an open-ear wearable.

14. The method of claim 9, wherein, in the first listening zone, the magnitude of the first bass content exceeds the magnitude of the second bass content by three decibels, wherein, in the second listening zone, the magnitude of the second bass content exceeds the magnitude of the first bass content by three decibels.

15. The method of claim 9, further comprising the step of adjusting at least one filter of a plurality of filters according to an error signal, the plurality of filters forming the first array configuration and the second array configuration.

16. The method of claim 9, further comprising the step of selecting a plurality of filters from a stored set of filters according to a parameter representative of a configuration of the cabin, the plurality of filters forming the first array configuration and the second array configuration.

* * * * *